(12) United States Patent
Hsieh

(10) Patent No.: US 8,750,711 B2
(45) Date of Patent: Jun. 10, 2014

(54) OPTICAL TRANSCEIVERS WITH CLOSED-LOOP DIGITAL DIAGNOSTICS

(75) Inventor: John Hsieh, Cupertino, CA (US)

(73) Assignee: Finisar Corporation, Sunnyvale, CA (US)

( * ) Notice: Subject to any disclaimer, the term of this patent is extended or adjusted under 35 U.S.C. 154(b) by 4 days.

(21) Appl. No.: 13/210,313

(22) Filed: Aug. 15, 2011

(65) Prior Publication Data

US 2011/0305454 A1 Dec. 15, 2011

Related U.S. Application Data

(63) Continuation of application No. 11/043,386, filed on Jan. 25, 2005, now Pat. No. 8,000,607.

(51) Int. Cl.
*H04B 10/00* (2013.01)

(52) U.S. Cl.
USPC .......................... 398/135; 398/164; 398/197

(58) Field of Classification Search
USPC .......... 398/128, 130, 135–139, 163–165, 197
See application file for complete search history.

(56) References Cited

U.S. PATENT DOCUMENTS

| | | | | |
|---|---|---|---|---|
| 6,160,647 A | * | 12/2000 | Gilliland et al. | 398/23 |
| 6,220,873 B1 | * | 4/2001 | Samela et al. | 439/76.1 |
| 6,496,291 B1 | * | 12/2002 | Raj et al. | 398/164 |
| 6,738,584 B1 | * | 5/2004 | Tsuda et al. | 398/147 |
| 2002/0027688 A1 | * | 3/2002 | Stephenson | 359/152 |
| 2003/0053170 A1 | * | 3/2003 | Levinson et al. | 359/152 |
| 2005/0078963 A1 | * | 4/2005 | Lenosky | 398/139 |
| 2005/0180754 A1 | * | 8/2005 | Mizue et al. | 398/135 |

* cited by examiner

*Primary Examiner* — Dzung Tran
(74) *Attorney, Agent, or Firm* — Maschoff Brennan

(57) ABSTRACT

Systems and methods for performing closed-loop diagnostics in optical transceiver. The TOSA of an optical receiver includes a primary transmit module and a secondary receiver module. The transmit module transmits a data signal to a ROSA of another optical transceiver. The ROSA has a secondary transmit module that can transmit a diagnostic data signal back to the secondary receiver module of the TOSA. The TOSA can use the diagnostic data received from the ROSA to automatically adjust itself and perform closed-loop feedback functions. The closed loop diagnostics can be implemented in a network where one transceiver may be connected with more than one other transceiver in a multi-node configuration.

20 Claims, 5 Drawing Sheets

OPTICAL TRANSCEIVERS WITH CLOSED-LOOP DIGITAL DIAGNOSTICS

CROSS-REFERENCE TO RELATED APPLICATIONS

This application is a continuation of U.S. patent application Ser. No. 11/043,386, "OPTICAL TRANSCEIVERS WITH CLOSED-LOOP DIGITAL DIAGNOSTICS," filed Jan. 25, 2005. The foregoing patent application is incorporated herein by reference in its entirety.

THE FIELD OF THE INVENTION

The present invention relates generally to the field of optical transceivers. More particularly, embodiments of the invention relate to optical transceivers with closed-loop diagnostics.

BACKGROUND OF THE INVENTION

High speed data communication networks often use optical transceivers to transmit and receive optical signals carrying digitally encoded data. Optical transceivers typically use an optical transmitter, such as a laser, to transmit optical signals and an optical receiver, such as a photodiode, to receive optical signals. Conventional transceivers require a pair of optical fibers to implement full-duplex functionality. One optical fiber connects with the optical transmitter while the other optical fiber connects with the optical receiver.

Advancements in optical data communication technology have enabled bidirectional data transmission over a single optical fiber. These bidirectional communication systems can allow for data to be transmitted in both directions over a single optical fiber instead of requiring an individual optical fiber for each direction of data transmission. Bidirectional communication technology increases bandwidth by essentially doubling the data payload capacity. While bidirectional communication in optical networks can increase the amount of information that can be transmitted and received, these networks may still be affected by data transmission errors. Such errors can be caused, for example, by improper laser driver power control or modulation.

Diagnostic information is often used to address these types of problems. However, conventional diagnostic functions are open-loop in nature. For example, an optical transmitter can report its own output power and an optical receiver can report its own received optical power. While the optical transmitter or the optical receiver can provide useful diagnostic information, the diagnostic information may not be at the location best suited to utilize the information and implement a correction procedure because of the open-loop nature of the system. For example, an optical receiver that reports low optical power cannot be used by the optical transmitter that transmitted the optical signal. In other words, human intervention is typically needed to fix any problems indicated by the diagnostic information provided by the optical transmitter or the optical receiver. Further, conventional optical transceivers cannot self-compensate to maintain the integrity of the optical data when the data link degrades.

BRIEF SUMMARY OF THE INVENTION

These and other limitations are overcome by embodiments of the present invention, which relate to systems and methods for closed loop diagnostics in an optical environment. Embodiments of the invention relate to self adjusting optical transceivers with closed loop diagnostics. Advantageously, a self adjusting optical transceiver enables high speed bidirectional communications in an optical network that can perform closed-loop feedback functions.

An exemplary embodiment of the invention provides an optical transceiver module that automatically adjusts to maintain an integrity of a data link. The optical transceiver can include a 'transmit' optical subassembly ("TOSA") and a 'receive' optical subassembly ("ROSA"). Accordingly, the TOSA can include a primary transmitter module, a secondary receiver module, and a first diagnostic module. The primary transmitter module can be configured for transmitting a first data signal through an optical fiber. Also, the secondary receiver module can be configured for receiving a second data signal through the same optical fiber. The first diagnostic module can be communicatively coupled with both the transmitting subassembly and the receiving subassembly. Additionally, the first diagnostic module can be configured to use at least a portion of the second data signal to adjust at least one of a power and a modulation of the first data signal. The second data signal may also be used to adjust the wavelength of the laser when the laser is tunable.

In another embodiment, the ROSA can include a primary receiver module, a secondary transmitter module, and a second diagnostic module. The primary receiver module can be configured for receiving a third data signal through a second optical fiber. Also, the secondary transmitter module can be configured for transmitting a fourth data signal through the second optical fiber. The second diagnostic module can be communicatively coupled with the receiver module and the transmitter module. Additionally, the second diagnostic module can be configured for using at least a portion of the third data signal to generate at least a portion of the fourth data signal, the at least a portion of the fourth data signal containing diagnostic data about the first data signal. One of skill in the art can appreciate that the first and second diagnostic modules can be embodied as a single diagnostic module that is used, when necessary by both the ROSA and/or the TOSA.

These and other exemplary embodiments of the present invention will become more fully apparent from the following detailed description and appended claims.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE EXEMPLARY EMBODIMENTS

The present invention relates to optical transceivers with closed-loop diagnostic functions. The systems and methods of the present invention enable diagnostic information to form a closed-loop between optical transceivers. The closed-loop enables, for example, an optical transceiver that receives an optical signal to transmit diagnostic information back to the transmitting optical transceiver. Embodiments of the invention enable closed-loop diagnostics without reducing the effective bandwidth of the data link between the optical transceivers. Embodiments of the invention also accommodate network architectures where, for example, multiple transceivers are included in the data link and a particular transceiver is connected with at least two other transceivers.

Reference will now be made to the drawings to describe various aspects of the exemplary embodiments of the invention. The drawings are diagrammatic and schematic representations of exemplary embodiments, and are not limiting of the present invention.

Operating Environment

While the exemplary embodiments of the invention discussed below are usable in conjunction with a high speed optical data transmission system conforming to the small form factor pluggable (SFP) standards or to be compatible with gigabit interface connectors (GBIC), such operating environments are exemplary only and embodiments of the invention can be employed in any of a variety of current and future high speed data transmission systems. Additionally, the invention can be operable with Gigabit Ethernet (GigE) and/or Fibre Channel and/or SONET compliant systems.

Figure 1:
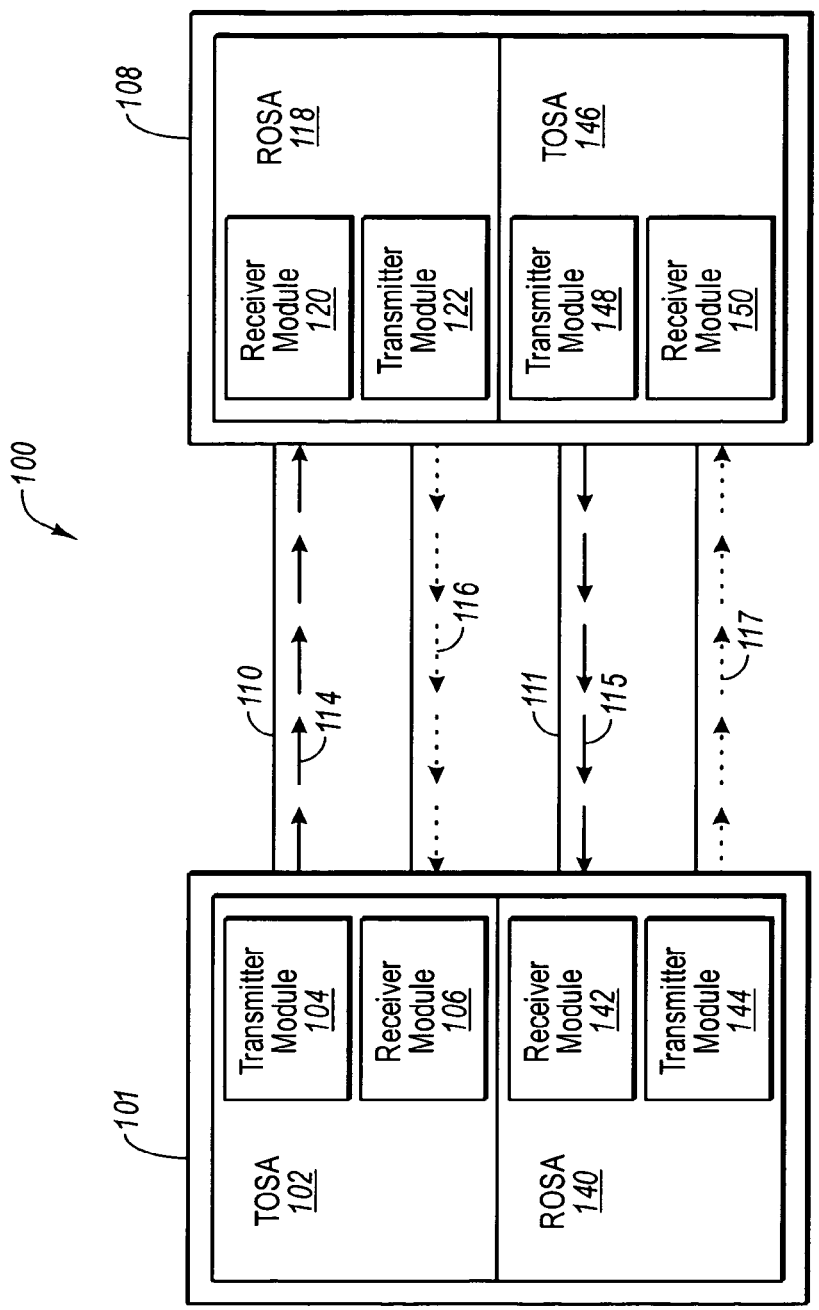
FIG. 1 is a schematic diagram that illustrates aspects of an exemplary embodiment of a duplex bidirectional transceiver system.

FIG. 1 is a schematic diagram that illustrates an exemplary embodiment of a bidirectional optical data communication system 100 in accordance with the present invention. FIG. 1 illustrates transceiver modules 101, 108 that are similarly configured, and are connected with the optical fibers 110, 111 and thus form an optical link. As described herein, the optical fibers 110, 111 are each a single fiber, however, multiple optical fibers can be utilized to link the transceiver modules 101, 108 when appropriate. Each transceiver module 101, 108 includes a 'transmit' optical subassembly ("TOSA") 102, 146 and a 'receive' optical subassembly ("ROSA") 118, 140.

In this example, the optical signal generated by each TOSA 102, 146 is received by a corresponding ROSA 118, 140 through the optical fibers 110, 111. The optical fibers 110, 111 can include new or legacy fibers, and some exemplary embodiments of the present invention can be implemented without necessitating any change in existing optical fibers and/or connectors.

Each TOSA 102, 146 includes a transmitter module 104, 148, and a receiver module 106, 150. Each ROSA 118, 140 similarly includes a transmitter module 122, 144 and a receiver module 120, 142. By using the transmitter modules 104, 122, 144, 148 and receiver modules 106, 120, 142, 150, the transceiver modules 101, 108 can perform bidirectional communication over each of the optical fibers 110, 111. Thus the TOSA 102 and the ROSA 118 can communicate bidirectionally over the optical fiber 110. The ROSA 140 and the TOSA 146 can similarly communicate bidirectionally over the optical fiber 111.

In one embodiment, the communication links between the transmitter modules 104, 148 and the receiver modules 120, 142 can transmit data payloads 114, 115 over the optical fibers 110, 11. Accordingly, the transmitter modules 104, 148 can be designated as primary transmitter modules 104, 148. Correspondingly, the receiver modules 120, 142 can be designated as primary receiver modules 120, 142.

Also, the communication link between the transmitter modules 122, 144 and the receiver modules 106, 150 can transmit diagnostic data signals 116, 117 over the optical fiber 110, 111. As such, the transmitter modules 122, 144 can be designated as secondary transmitter modules 122, 144. Correspondingly, the receiver modules 106, 150 can be designated as secondary receiver modules 106, 150.

The inclusion of transmitters in a ROSA and receivers in a TOSA allows for both the ROSA and the TOSA to each transmit and receive data. Accordingly, the transmitters in the TOSA can be considered primary and the receivers within the TOSA can be considered secondary because the TOSA transmitters are primarily transmitting the data payload and the TOSA receivers are performing a secondary function of receiving diagnostic data about that data payload. Similarly, the receivers in the ROSA can be considered primary and the transmitters within the ROSA can be considered secondary because the ROSA receivers are primarily receiving the data payload and the ROSA transmitters are transmitting diagnostic information about the optical quality of the received data payload back to the originating TOSA. This can be useful because the information received by a ROSA may have an inadequate optical quality, and providing the ROSA with the transmission capability can allow for diagnostic data pertaining to the inadequate optical quality to be transmitted back to the originating TOSA. Accordingly, the TOSA can then adjust the transmission to improve the optical quality received at the ROSA.

With continuing reference to FIG. 1, the transceivers 101, 108 can each implement closed-loop digital diagnostics and transfer diagnostic data 116, 117 from each ROSA 118, 140 back to its corresponding TOSA 102, 146 using the secondary transmitter 122, 144 and secondary receiver modules 106, 150. The optical fibers 110, 111 can carry data payloads 114, 115 and diagnostic data 116, 117 in both directions across the optical fiber.

One advantage of the present invention, in comparison to conventional bidirectional systems is that the diagnostic data transmitted, for example, by the secondary transmitter modules 122, 144 does not consume any of the bandwidth available to the primary transmitter modules 104, 148. This is because the primary and secondary transmitters that transmit signals over the same optical fiber can propagate the data at different wavelengths.

Figure 2:
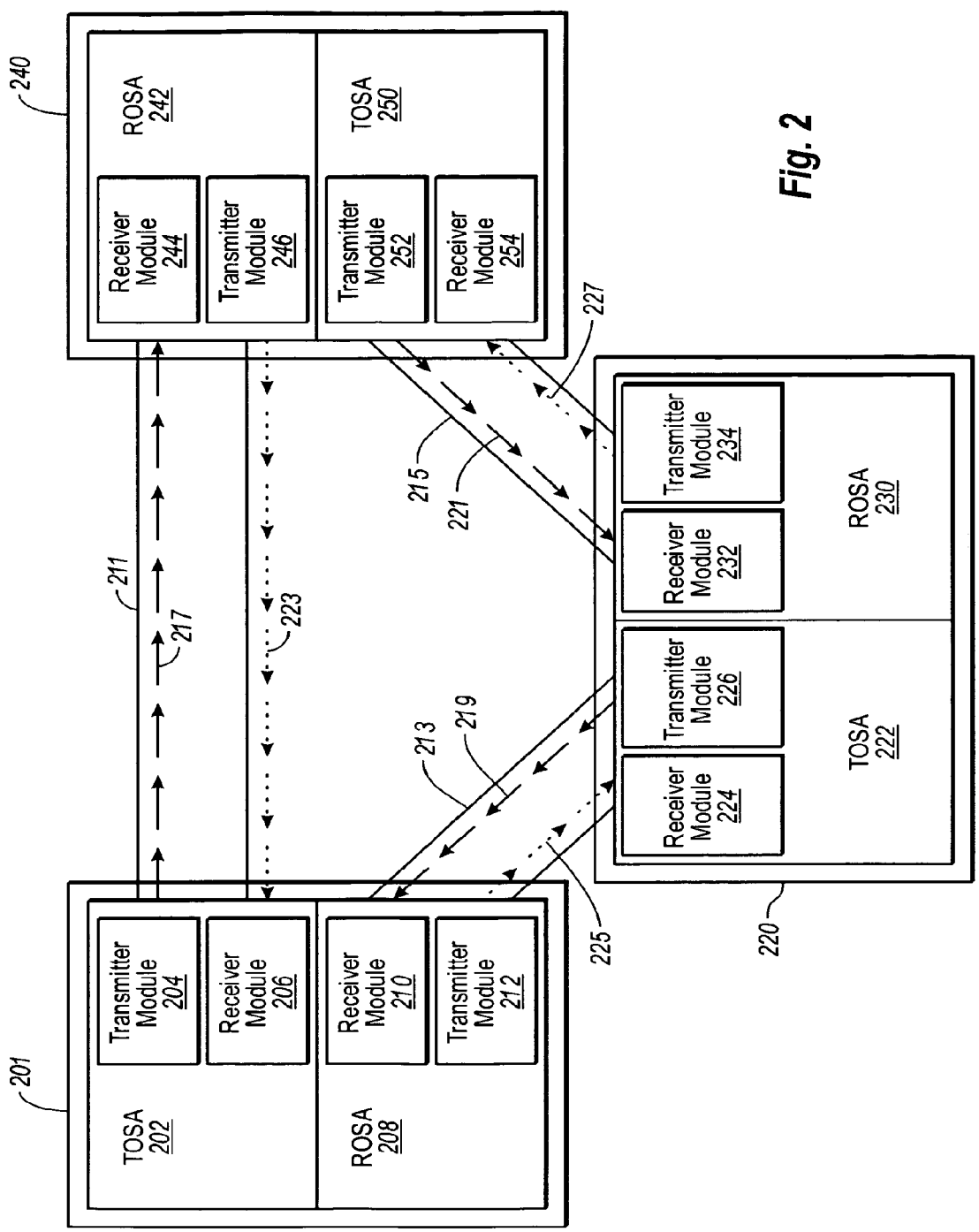
FIG. 2 is a schematic diagram that illustrates aspects of an exemplary embodiment of duplex bidirectional transceiver assemblies within a duplex bidirectional communication system.

Referring now to FIG. 2, details are provided concerning the general architecture of an exemplary embodiment of the present invention that includes a multi-node communication system 200. Such a multi-node communication system 200 can include multiple independent transceivers 201, 220, 240. Each transceiver 201, 220, 240 includes a TOSA 202, 222, 250 and a ROSA 208, 230, 242. Accordingly, the TOSA 202 is in communication with the ROSA 242 over optical fiber 211, the TOSA 222 is in communication with the ROSA 208 over optical fiber 213, and the TOSA 250 is in communication with the ROSA 230 over optical fiber 215.

Additionally, each TOSA 202, 222, 250 includes a transmitter module 204, 226, 252 and a receiver module 206, 224, 254. The transmitter modules and receiver modules of the transceivers 201, 220, 240 can be either primary or secondary modules as described previously with respect to FIG. 1.

An advantage of the present inventive multi-node communication system 200 allows for closed-loop digital diagnostics between two communicatively coupled transceivers within a multi-node communication system over a single optical fiber. For example, the TOSA 202 can communicate with the ROSA 242. As such, the TOSA 202 can transmit a data payload 217 over optical fiber 211 to the ROSA 242, and the ROSA 242 can transmit diagnostic data 223 pertaining to the signal quality of the data payload 217 back to the originating TOSA 202 over the same optical fiber 211.

This multi-node communication system configuration allows for a ROSA to analyze the optical quality of the data payload sent by a TOSA, and then transmit diagnostic information back to the TOSA so that the data payload signal can be adjusted to improve the optical quality. Thus, closed-loop feedback control can be implemented between each TOSA and ROSA within a multi-node network to improve the quality of the data payload signals. Additionally, the multi-node communication system can include a plurality of transceivers where each TOSA and ROSA communication linked together over a single optical fiber, as exemplified by TOSA 202 and ROSA 242, can implement the closed-loop feedback control. Also, is should be appreciated that a multi-node communication system can include more than just three nodes as exemplified.

Structure

Figure 3:
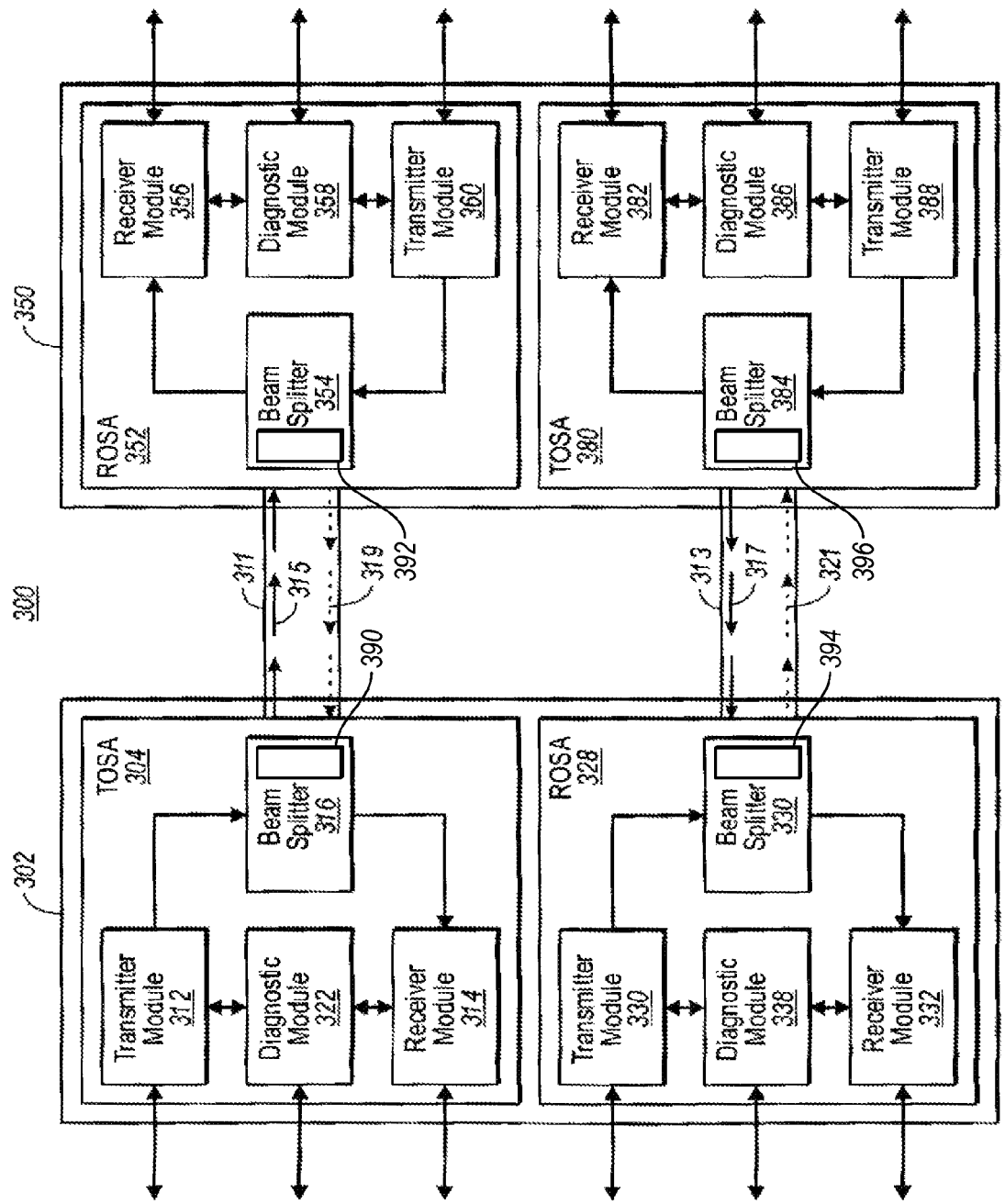
FIG. 3 is a schematic diagram that illustrates an embodiment of a bidirectional transceiver module operable within a duplex bidirectional communication system.

With reference now to FIG. 3, another exemplary embodiment of the present invention includes details of bidirectional optical communication between a two-node pair 300, although one of skill in the art can appreciate that the embodiments of the invention can be implemented in a multimode system as well. Such an embodiment can include first and second transceiver modules 302, 350, which can be identical modules, each having a pair of bidirectional subassemblies. The first transceiver module 302 includes a bidirectional TOSA 304 and a bidirectional ROSA 328. Also, the second transceiver module 350 includes a bidirectional ROSA 352 and a bidirectional TOSA 380. Each of the bidirectional subassemblies in the first transceiver module 302 are in communication with their corresponding bidirectional subassemblies in the second transceiver module 350 through the optical fibers 311, 313.

Each of the bidirectional subassemblies within the transceivers 302, 350 can include various modules. As such, the TOSA 304 includes a primary transmitter module (PTxM) 312 and a secondary receiver module (SRxM) 314, and the ROSA 352 includes a primary receiver module (PRxM) 356 and a secondary transmitter module (STxM) 360. Also, the ROSA 328 includes a primary receiver module (PRxM) 332 and a secondary transmitter module (STxM) 330, and the TOSA 380 includes a primary transmitter module (PTxM) 388 and a secondary receiver module (SRxM) 382. These modules are configured to be in communication with their counterparts in the bidirectional system through optical fibers 311, 313.

The transmitter modules can be configured to provide different wavelengths. For example without limitation, the TOSA 304 PTxM 312 can be a 1550 nanometer (nm) distributed feedback (DFB) laser, thereby providing a first wavelength data transmission ($\lambda_1$) to communicate the data payload 315. On the other hand, the ROSA 352 STxM 360 can be, also by way of example only, a 1310 nm Fabry Perot (FP) laser, thereby providing a second wavelength data transmission ($\lambda_2$) to communicate the diagnostic data 319. Thus, the first and second wavelength data transmissions for the payload data ($\lambda_1$) and diagnostic data ($\lambda_2$) can be propagated over the same optical fibers in opposite directions. Additionally, the receiver module can include photodetector, such as a photodiode to detect the incoming data signals.

With respect to the TOSA 304 and the ROSA 352 communicative pair, the PTxM 312 is communicatively coupled to a first end of an optical fiber 311 through a beam splitter 316 and the PRxM 356 is communicatively coupled to a second end of the optical fiber 310 through another beam splitter 354. As such, the PTxM 312 can transmit a data payload 315 to the PRxM 356 over the optical fiber 311. Additionally, the STxM 360 is communicatively coupled to the second end of the optical fiber 311 through the beam splitter 354, and the SRxM 314 is communicatively coupled to the first end of optical fiber 311 through the beam splitter 316, where the STxM 360 can transmit diagnostic data 319 to the SRxM 314.

In accordance with the present invention, the beam splitters of the TOSA and the ROSA can be similar and even configured to be identical when appropriate. The beam splitters can be configured to separate two different wavelengths transmitted from the TOSA and from the ROSA because both optical signals will pass through each beam splitter at the TOSA and the ROSA. The beam splitter can receive a signal from a transmitter module at a first wavelength ($\lambda_1$) and route the signal into the optical fiber. From the opposite direction, the beam splitter can also receive a second signal at a second wavelength ($\lambda_2$) from the same optical fiber. The beam splitter then reflects the second signal at the second wavelength ($\lambda_2$) towards the receiver module. Accordingly, the TOSA beam splitter can transmit $\lambda_1$ and reflect $\lambda_2$, while the ROSA beam splitter can transmit $\lambda_2$ and reflect $\lambda_1$. For example without limitation, the exemplary transmitter wavelengths of approximately 1310 nm for the secondary transmitter and 1550 nm for the primary transmitter can be distinguished with a beam splitter having high reflectivity for either the 1310 nm or 1550 nm wavelength bands and a high transmission for the other wavelength. One of skill in the art can appreciate that other wavelengths can be used to implement the closed loop diagnostics.

In an alternative embodiment of the present invention, the bidirectional optical data communication system described herein does not require the primary transmitters that transmit the data payload and secondary transmitters that transmit the diagnostic data to transmit significantly different wavelengths. Each transceiver module can include an echo cancellation device configured to remove the crosstalk and/or reflected transmission optical signals that are not intended to be received by the receiver. For example, when some portion of the payload data signal is reflected back into the transceiver, an echo cancellation device can extinguish the payload data signal from the diagnostic data signal so as to prevent the diagnostic data signal from being corrupted by reflected signals. In one aspect, the echo cancellation device can be part of the beam splitters. For example, in some embodiments, the beam splitter 316 may include an echo cancellation device 390, the beam splitter 354 may include an echo cancellation device 392, the beam splitter 330 may include an echo cancellation device 394, and the beam splitter 384 may include an echo cancellation device 396.

With continuing reference to FIG. 3, while the PTxM 312 is communicatively coupled to the beam splitter 316 the beam splitter 316, is also communicatively coupled to the SRxM 314. This can allow optical data received into the beam splitter 316 from the optical fiber 311 to pass to the SRxM 314. Additionally, the SRxM 314 is communicatively coupled to a diagnostic module 322, which in turn is then communicatively coupled to the PTxM 312. This can allow the SRxM 314 to transfer diagnostic data to the diagnostic module 322 so that transmission control parameters can be transferred to the PTxM 312 for improving the quality of the data payload signal. Thus, the TOSA 304 can self-adjust the optical data transmission signal by using the received diagnostic data.

Additionally, with a more specific reference to ROSA 352, the beam splitter 354 is configured to receive the data payload 315 from the optical fiber 311, and transfer the data payload 315 to the PRxM 356. The PRxM 356 is also communicatively coupled to a diagnostic module 358, which in turn is communicatively coupled to the STxM 360. This enables the PRxM 356 to transfer information pertaining to the incoming data payload 315 or a portion of the data payload to the diagnostic module 358, where the diagnostic module can then analyze the quality of the data payload 315 to determine whether the quality is adequate or needs improvement. As such, the diagnostic module 358 can then generate diagnostic data 319 pertaining to the quality of the data payload 315 signal, which can then be transferred to the STxM 360. The STxM 360 is configured to transmit the diagnostic data 319 to the beam splitter 354, which routes the diagnostic data 319 into the optical fiber 311 for transmission to the corresponding TOSA 304.

Since the transceiver modules 302, 350 are substantially identical, with the TOSA 304 communicating with the ROSA 352 being substantially identical to the TOSA 380 communicating with the ROSA 328, the TOSA 380 and the ROSA 328 operate as described above. In other words, the ROSA 328 functions similarly to the ROSA 352 and the TOSA 380 functions similarly to the TOSA 304.

An exemplary embodiment of the present invention can include the transceiver modules 302, 350 to be each coupled with a host computing system ("host") (not shown). The TOSA 304, 380 and the ROSA 352, 328 can be coupled to a host via any of the subassemblies.

In another embodiment, the optical transceiver of the instant invention can include additional components. Some of the additional components that can be included within a receiving aspect of the transceiver can include transimpedance amplifiers, post-amplifiers, detector and loss of signal detectors for processing the data signal that is received into the receiver module. Additionally, the transmitter module can include a laser, laser driver, laser driver power controller, monitor, and auto-shutdown controller. The receiver module and transmitter module components can be controlled with a control module that can adjust settings of the transceiver.

Figure 4:
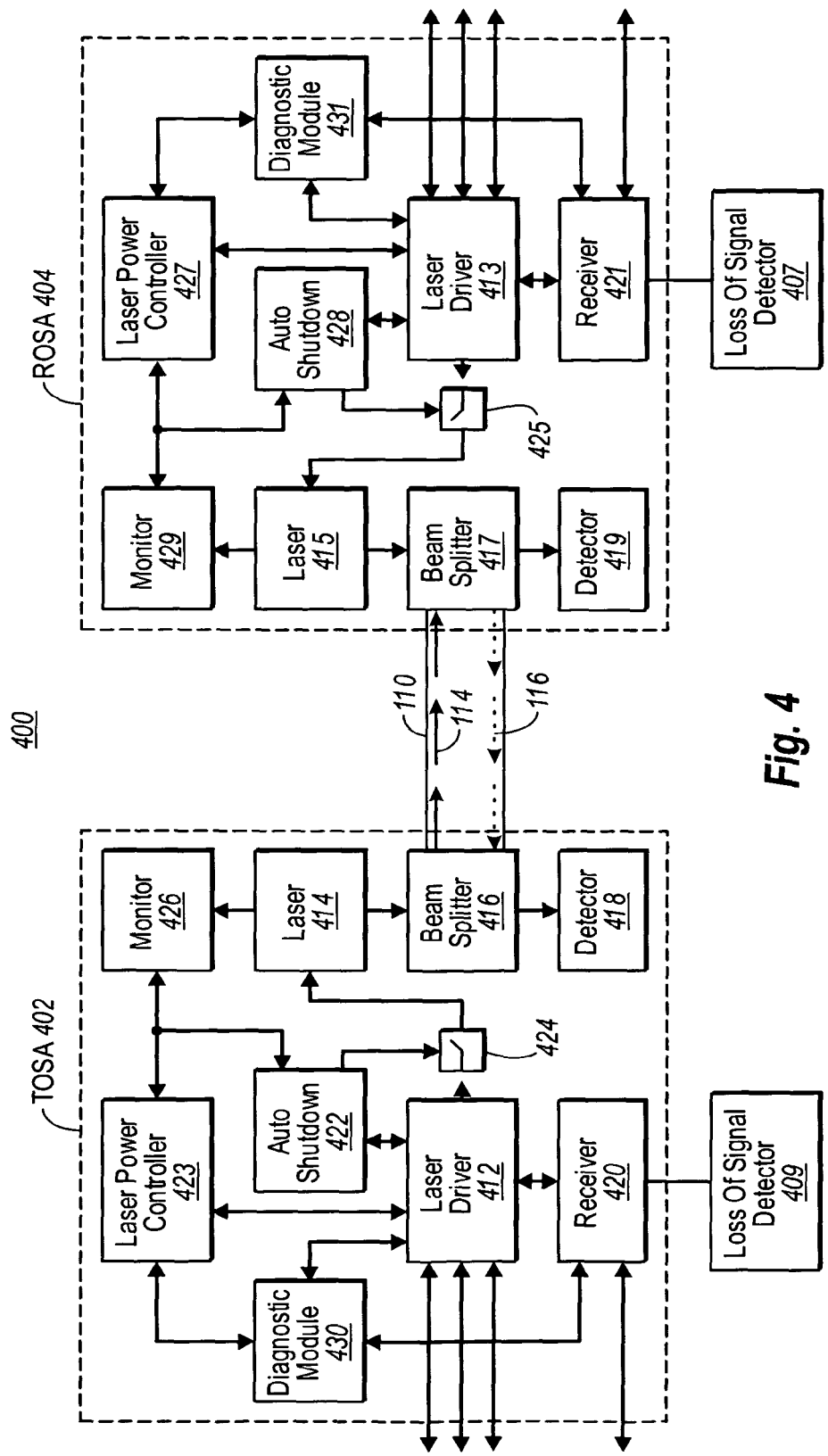
FIG. 4 is a schematic diagram that illustrates an embodiment of bidirectional transceiver modules operable in a bidirectional communication system.

Referring now to FIG. 4, a detailed exemplary embodiment of the present invention includes a TOSA 402 in communication with a ROSA 404. The TOSA 402 and the ROSA 404 are configured to communicate via an optical fiber 110, where the TOSA 402 sends a data payload 114 to the ROSA 404 and the ROSA sends diagnostic data 116 to the TOSA 402. Accordingly, both the TOSA 402 and the ROSA 404 include components to enable bidirectional communication over the single optical fiber 110. In one aspect, the TOSA 402 and the ROSA 404 can each be independently coupled with a host.

The TOSA 402 can be configured to receive data input from the host into a laser driver 412, where the data received into the laser driver 412 is converted into signals to be emitted from a laser 414 as a data payload 114 optical signal. One such data input received into the laser driver 412 can be a transmission disablement input (TxDIS) that disables the data transmission from the laser driver 412 to the laser 414.

Within the TOSA 402, a laser driver power controller 426 is coupled with and regulates the laser driver 412. Also, the laser driver 412 is communicatively coupled with the laser 414 so that the laser driver 412 can provide power and modulation parameters to the laser 414 to control the optical data signal transmission characteristics.

The laser 414 emits light carrying the optical data to a beam splitter 416, where at least a portion of the laser light can be transferred to a laser monitor 428 to determine the characteristics of the laser transmission power and/or modulation. The beam splitter 416 then routes the optical data signal into the optical fiber 110 to transmit the data payload 114 to the ROSA 404.

The laser monitor 426 receives and analyzes the laser transmission power and/or modulation in order to provide the laser driver 412 with instructions for adjustments to correct the laser transmission characteristics. As such, the laser monitor 426 transfers the information pertaining to the laser transmission to the laser driver power controller 423 and an auto-shutdown controller 422. The laser power controller 423 is configured to provide the laser driver 412 with power and/or modulation adjustments so that the laser 414 can emit a signal with improved quality. As such, the monitor 426, laser power controller 423, and auto-shutdown controller 422 can adjust the quality of the optical signal through an internal control mechanism and/or procedure within the TOSA 402.

Additionally, the auto-shutdown controller 422 is communicatively coupled with the laser driver 412 so that when the laser monitor 426 indicates that the laser transmission should be shut down, the laser driver 412 can cease transferring data to the laser 414. In another aspect, the auto-shutdown controller 422 can be communicatively coupled with an auto-shutdown assembly 424, where this redundant communication system can allow for the auto-shutdown controller 422 to sever the data connection to the laser 414. This optional aspect can be implemented when the laser driver 412 does not respond to the auto-shutdown controller 422.

The beam splitter 416 is coupled to the optical fiber 110 so as to transmit the data payload 114 and to receive the diagnostic data 116 sent from the ROSA 404. The beam splitter 416 is also communicatively coupled to detector 418 to communicate the diagnostic data 116 received from the ROSA 404 to the detector 418. After the detector 418 receives the diagnostic data 116 from the beam splitter 416, the optical diagnostic data 116 is typically converted to a corresponding electrical data signal. Also, the detector 418 is communicatively coupled to a receiver 420 so that the electrical diagnostic data can be transferred to the receiver 420.

When the receiver 420 obtains the diagnostic data, the data can be processed and/or analyzed for power and/or modulation parameters, which can include the power and/or modulation parameter of either the transmission signal emitted by the TOSA 402 or ROSA 404. Also, the receiver 420 can be coupled to a loss of signal detector ("LOS") 409, which can detect the signal power and associated current or voltage parameters to determine whether the received diagnostic data signal is sufficiently powerful. The receiver 420 can be configured to have more than one output, which can transfer the received diagnostic data to a host or to a diagnostic module 430 or directly to the laser driver 412.

The diagnostic module 430 can be configured to receive the diagnostic data for processing and/or analysis to determine whether any of the laser transmission parameters could be adjusted to provide a better signal at the receiving ROSA 404. Such laser transmission parameters can include, without limitation, laser power and/or modulation. For example, the diagnostic module 430 can interpret the diagnostic data to determine whether the laser power at the receiving transceiver is inadequate, and then implement a power increase command. Accordingly, the diagnostic module 430 can send the power increase command to the laser driver power controller 426 or to the laser driver 412 to increase the power of the laser 414.

For example, the diagnostic module 430 can interpret the diagnostic data to indicate that the laser modulation is improper and the signal being received by the ROSA 404 is unacceptable or unreadable. The diagnostic module 430 can then implement a modulation adjustment command and send the command to the laser driver 412 to adjust the laser modulation. Of course other laser adjustments can be made in accordance with the transmission signal characteristics received by the ROSA 404, and any of the TOSA 402 components can be configured to make the proper adjustments to obtain an adequate data transmission signal.

In another embodiment, the ROSA 404 is configured to receive the payload data 114 transmitted from the TOSA 402 via the optical fiber 110 and transmit the diagnostic data 116 over the same optical fiber 110. The optical fiber 110 is coupled to a beam splitter 417 which routes the payload data 114 to a detector 419. The beam splitter 417 is communicatively coupled with the detector 419 so that the received optical data payload 114 can be converted to electrical data for further processing and distribution. The beam splitter 417 is also communicatively coupled to a laser 415.

The detector 419 is also communicatively coupled with the receiver 421 so that the data received into the ROSA 404 can be transferred to the receiver 421. The receiver 421 can process and/or analyze the received data, and transfer the data payload to the host computing system. Also, the receiver can be communicatively coupled to a loss of signal detector (LOS) 407. The receiver 421 can be configured to have more than one output, which can transfer the received data to a host or to a diagnostic module 431 or directly to the laser driver 413.

The diagnostic module 431 is configured to receive data from the receiver 421 for processing and/or analysis of the data payload 116 to determine whether any of the TOSA 402 laser transmission parameters could be adjusted in order to provide better signal quality at the ROSA 404. The laser transmission parameters can include, without limitation, laser power and/or modulation. For example, the diagnostic module 431 can analyze the data payload signal and determine the laser power being received into the ROSA 404 to be inadequate, and then generate diagnostic data for instructing the TOSA 402 to implement a power increase command. Alternatively, the closed-loop diagnostics can be used to lower the laser power of the TOSA 402 if the ROSA 404 is being saturated.

The diagnostic module 431 then sends the diagnostic data to a laser driver power controller 427 or to a laser driver 413 for transmission back to the TOSA 402. Accordingly, the laser power controller 427 and/or the laser driver 413 can direct the laser 415 to transmit an optical signal carrying the diagnostic data to the TOSA 402, where a laser 415 emits light into the beam splitter 417 which is then routed into the optical fiber 110.

Additionally, a monitor 429 can receive some of the optical data signal from the laser 415 to determine the characteristics of the diagnostic laser transmission power and/or modulation. The monitor 429 can analyze the laser transmission power and/or modulation in order to provide the laser driver 413 with adjustments to correct the laser transmission. As such, the monitor is configured to transfer the information pertaining to the laser transmission to the laser driver power controller 427 and the auto-shutdown controller 428.

The laser power controller 427 is configured to provide the laser driver 413 with power and/or modulation adjustments so that the laser 415 can emit an improved signal from the ROSA 404. Also, the auto-shutdown controller 428 can be communicatively coupled with the laser driver 413 to terminate transmission of the diagnostic data signal when the monitor indicates that the laser should be shut down. Additionally, the auto-shutdown controller 428 can be communicatively coupled with the diagnostic auto-shutdown assembly 425 to provide a redundant system to terminate the transmission of the diagnostic data when the laser driver 413 does not respond to the auto-shutdown controller 428.

In another embodiment of the present invention, the ROSA 404 can be configured to receive data input from the host into the laser driver 413, where the data received into the laser driver 413 from the host is converted into signals to be emitted from the laser 415. Such data can be carried through the optical fiber 110 along with the diagnostic data signal. Accordingly, the ROSA 404 can be configured to transmit a data payload along with the diagnostic data 116 to the TOSA 402. Thus, the laser driver 413 can have more than one input from the host, which can include a transmission disablement input (TxDIS) and data payload inputs.

In another exemplary embodiment of the present invention, the TOSA diagnostic modules, shown in FIGS. 3 and 4 that primarily serve to provide the laser with adjustment commands to adjust the laser signal in order to provide the corresponding ROSA with an adequate data signal, are optional. Accordingly, these diagnostic modules can be incorporated into the primary transmitter modules or the secondary receiver modules of FIG. 3 and any of the TOSA components of FIG. 4. Thus, these diagnostic modules can be incorporated into any part of the TOSA so long as the laser transmission characteristics are adjustable at the TOSA in order to provide the ROSA with an adequate data signal. For example, with reference back to FIG. 3, the diagnostic module 322 of the TOSA 304 can be incorporated into the secondary receiver module 314. As such, the receiver module 314 can instruct the transmitter module to change the laser transmission characteristics in accordance with the signal quality needs at the corresponding ROSA 352.

Similarly, another exemplary embodiment of the present invention provides for the ROSA diagnostic modules shown in FIGS. 3 and 4 that primarily serve to generate diagnostic data about the quality of the payload data received into the ROSA to be optional. As such, these diagnostic modules can be incorporated into the primary receiver modules or secondary transmitter modules of FIG. 3, and any of the ROSA components in FIG. 4 so long as the ROSA is capable of generating diagnostic data for closed-loop feedback control of the transmitted signal.

In another aspect, the optical signal transmitting components (e.g., laser or light emitting diode) used in the secondary transmitter that transmits the diagnostic data back to the originating transceiver can be of lower quality than the originating primary transmitter. The diagnostic data does not require as much bandwidth as the primary transmitter, for example. Also, the secondary optical signal receiving components such as a photodiode can be of lower quality than the primary receiver. Accordingly, manufacturing rejects for primary transmitters and primary receivers can be adequately used as secondary transmitters and secondary receivers, which can decrease overall costs.

Methods of Operation

In practicing the invention, the transceiver modules, components, and subcomponents can be operable in a closed-loop feedback controlled bidirectional optical data network system. The system can be configured to bidirectionally transmit and receive data over a single optical fiber. A transceiver having a transmit port and a receive port can transmit bidirectionally over two fibers. In such a system, methods can be implemented for closed-loop feedback control of the TOSA laser transmission characteristics. Accordingly, an optical transceiver module can automatically adjust, for example, the power and/or modulation of a transmitted signal to maintain the integrity of a data link.

Figure 5:
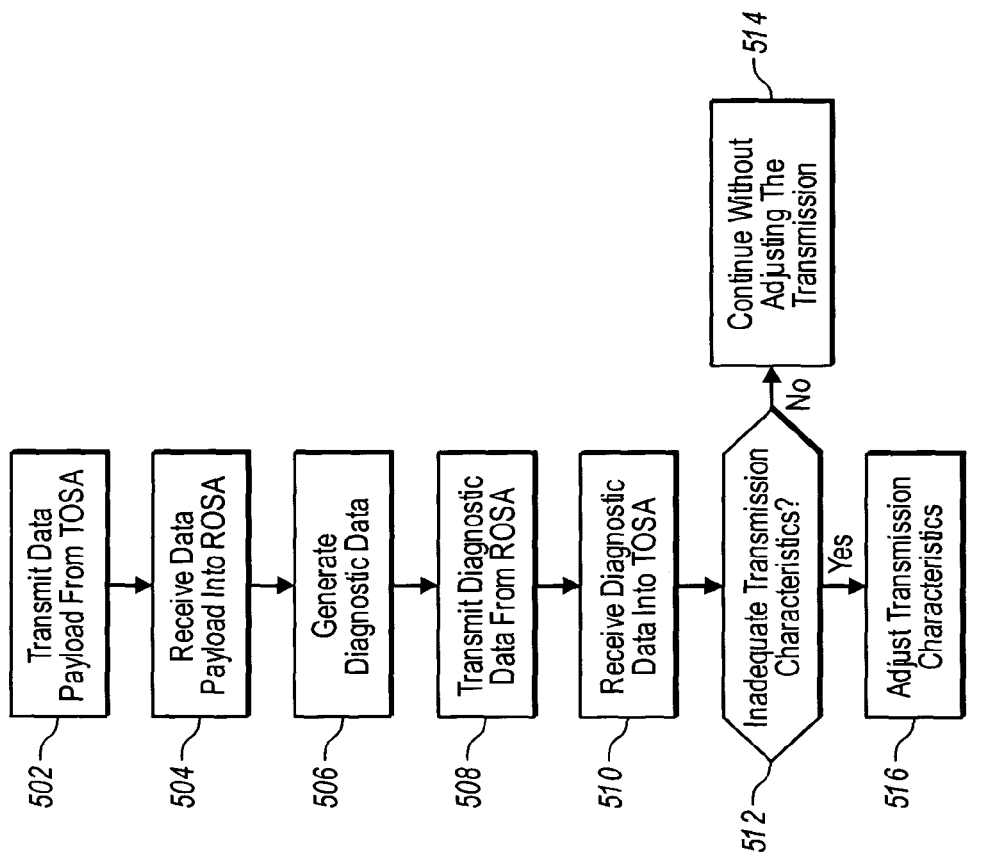
FIG. 5 is a flow diagram that illustrates some aspects of an exemplary method operable with a duplex bidirectional communication system.

With reference to FIG. 5, an exemplary embodiment of the present invention provides a method 500 for implementing closed-loop feedback control of the laser transmission between two or more transceiver modules, each including a TOSA and a ROSA. Accordingly, the TOSA of a transceiver transmits a data signal to the ROSA of another transceiver (stage 502). As such, the ROSA receives the data signal sent from the TOSA (stage 504). After the data signal has been received into the ROSA, diagnostic data pertaining to the data signal is generated (stage 506) in the ROSA. The diagnostic data can be generated to identify the adequacy or inadequacy of the data signal at the site of reception. Thus, the diagnostic data can indicate whether the transmission needs to be increased in power or whether the modulation characteristics need adjusting.

The diagnostic data is then transmitted from the ROSA (stage 508), which is then received into the originating TOSA (stage 510). The TOSA can then determine whether the diagnostic data indicates whether the transmission characteristics are adequate or inadequate (stage 512). When the diagnostic data indicates the data signal received into the ROSA is adequate, the TOSA can continue transmission without adjusting the characteristics of the laser (stage 514). On the other hand, when the diagnostic data indicates that the transmission characteristics are inadequate when received into the ROSA, the TOSA can adjust the appropriate laser transmission characteristics (stage 516), such as power and/or modulation.

In another exemplary embodiment of the present invention, a method for implementing closed-closed loop digital diagnostics can operate continuously. While the TOSA is transmitting a data payload to the ROSA, the ROSA can simultaneously transmit diagnostic data back to the originating TOSA. This can provide continuous adjustments in order to maintain a high quality for the signals being transmitted.

With respect to the aspect of generating diagnostic data, the generation can be by any process and utilize any portion of the data payload that results in diagnostic data pertaining to the data payload. The diagnostic data allows the transceiver originating the data payload to alter the power and/or modulation of the transmission signal to improve the data signal characteristics at the receiving transceiver. Such diagnostic data generation can include; taking a portion of the data signal and transferring it back to the originating transceiver; processing the data signal through an algorithm to obtain information about the signal; measuring signal parameters and transferring the parameters back to originating transceiver; and/or creating data that indicates the adequacy or inadequacy of the signal characteristics.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A bidirectional 'transmit' optical subassembly ("TOSA") in an optical transceiver that automatically adjusts to maintain an integrity of a data link, the bidirectional TOSA comprising:

a transmitter module for transmitting a first data signal at a first wavelength of light through an optical fiber connected with the TOSA;

a receiver module included with the transmitter module for receiving a second data signal through the optical fiber, the second data signal including diagnostic data and being transmitted at a second wavelength of light;

a diagnostic module communicatively coupled with the transmitter module and the receiving module, the diagnostic module using at least the diagnostic data in the second data signal to adjust at least one of a power, a wavelength, and a modulation of the first data signal;

an echo cancellation device; and a beam splitter communicatively coupled to the transmitter module, the receiver module, and the optical fiber, the beam splitter being configured to be reflective with respect to the first wavelength and transmissive with respect to the second wavelength or being configured to be reflective with respect to the second wavelength and transmissive with respect to the first wavelength, the reflectivity and transmittance of the beam splitter being configured to separate the first wavelength from the second wavelength such that the first data signal is transmitted from the transmitter module to the optical fiber and the second data signal received from the optical fiber is directed to the receiver module.

2. A bidirectional TOSA according to claim 1, wherein the transmitter module includes at least one of a laser, laser driver, laser power controller, monitor, and auto-shutdown controller.

3. A bidirectional TOSA according to claim 2, wherein the diagnostic module is integrated into the transmitter module.

4. A bidirectional TOSA according to claim 1, wherein the receiver module includes at least one of a detector, a receiver, a loss of signal circuit, a photodiode, a transimpedence amplifier, and a post-amplifier.

5. A bidirectional TOSA according to claim 4, wherein the diagnostic module is integrated into the receiver module.

6. A bidirectional TOSA according to claim 1, wherein the first wavelength and the second wavelength are not significantly different wavelengths.

7. A bidirectional TOSA according to claim 6, wherein the echo cancellation device is part of the beam splitter.

8. An optical transceiver module that automatically adjusts to maintain an integrity of a data link, a 'receive' optical subassembly ("ROSA") comprising:

a receiver module for receiving a first data signal through an optical fiber, the first data signal being transmitted at a first wavelength of light;

a transmitter module included with the receiver module for transmitting a second data signal at a second wavelength of light through the optical fiber;

a diagnostic module communicatively coupled with the receiver module and the transmitter module, the diagnostic module using at least a portion of the first data signal to generate at least a portion of the second data signal, the at least a portion of the second data signal containing diagnostic data about the first data signal;

an echo cancellation device; and a beam splitter communicatively coupled to the transmitter module, the receiver module, and the optical fiber, the beam splitter being configured to be reflective with respect to the first wavelength and transmissive with respect to the second wavelength or being configured to be reflective with respect to the second wavelength and transmissive with respect to the first wavelength, the reflectivity and transmittance of the beam splitter being configured to separate the first wavelength from the second wavelength such that the second data signal is transmitted from the transmitter module to the optical fiber and the first data signal received from the optical fiber is directed to the receiver module.

9. A bidirectional ROSA according to claim 8, wherein the diagnostic data can be used by a second optical transceiver module connected with the receiver module to adjust at least one of a power, a wavelength, and a modulation of the first data signal transmitted by the second optical transceiver module.

10. A bidirectional ROSA according to claim 8, wherein the transmitter module includes at least one of a laser, laser driver, laser power controller, monitor, and auto-shutdown controller.

11. A bidirectional ROSA according to claim 10, wherein the diagnostic module is integrated into the transmitter module.

12. A bidirectional ROSA according to claim 8, wherein the receiver module includes at least one of a detector, a receiver, a loss of signal circuit, a photodiode, a transimpedence amplifier, and a post-amplifier.

13. A bidirectional ROSA according to claim 12, wherein the diagnostic module is integrated into the receiver module.

14. A bidirectional ROSA according to claim 8, wherein the first wavelength and the second wavelength are not significantly different wavelengths.

15. A bidirectional ROSA according to claim 14, wherein the echo cancellation device is part of the beam splitter.

16. In a bidirectional optical communication system that includes one or more optical transceivers, a method for automatically adjusting the one or more optical transceivers, the method comprising:

transmitting a data signal at a first wavelength of light from a 'transmit' optical subassembly ("TOSA") of a first optical transceiver into a 'receive' optical subassembly ("ROSA") of a second optical transceiver over a particular optical fiber;

receiving, at the TOSA, diagnostic data associated with the data signal in a diagnostic data signal generated by and transmitted from the ROSA at a second wavelength of light over the particular optical fiber;

adjusting, in the TOSA, at least one of a power and a modulation and a wavelength of the data signal in response to the diagnostic data received by the TOSA;

removing, by an echo cancellation device, one or more of crosstalk and reflected transmission of the data signal from the diagnostic data signal; and separating, by a beam splitter, the first wavelength from the second wavelength, the beam splitter being configured to be reflective with respect to the first wavelength and transmissive with respect to the second wavelength or being configured to be reflective with respect to the second wavelength and transmissive with respect to the first wavelength, the reflectivity and transmittance of the beam splitter being configured to separate the first wavelength from the second wavelength such that the diagnostic data signal is directed to a secondary receiver module of the TOSA and such that the data signal is transmitted to the ROSA over the particular optical fiber.

17. A method in accordance with claim 16, wherein the data signal is analyzed at the ROSA to generate the diagnostic data.

18. A method in accordance with claim 16, transmitting the diagnostic data signal is transmitted using a secondary transmit module of the ROSA.

19. A method in accordance with claim 16, wherein the first wavelength and the second wavelength are not significantly different wavelengths.

20. A method in accordance with claim 19, wherein the echo cancellation device is part of the beam splitter.

* * * * *

UNITED STATES PATENT AND TRADEMARK OFFICE
CERTIFICATE OF CORRECTION

PATENT NO. : 8,750,711 B2
APPLICATION NO. : 13/210313
DATED : June 10, 2014
INVENTOR(S) : Hsieh Page 1 of 1

It is certified that error appears in the above-identified patent and that said Letters Patent is hereby corrected as shown below:

In the Claims

In Column 14, Line 28, in Claim 18, delete "transmitting the" and insert -- wherein the --, therefor.

Signed and Sealed this
Third Day of March, 2015

Michelle K. Lee
*Deputy Director of the United States Patent and Trademark Office*